United States Patent

Olson

[11] Patent Number: 5,193,838
[45] Date of Patent: Mar. 16, 1993

[54] TRACTOR HITCH ASSEMBLY

[76] Inventor: Brian R. Olson, 3018 Gordon Rd., Regina, Saskatchewan, Canada S4S 2T8

[21] Appl. No.: 700,054

[22] Filed: May 8, 1991

Related U.S. Application Data

[63] Continuation of Ser. No. 365,702, Jun. 14, 1989, abandoned.

[30] Foreign Application Priority Data

Jun. 20, 1988 [GB] United Kingdom ............. 8814627

[51] Int. Cl.⁵ .............................................. B60D 1/26
[52] U.S. Cl. .................... 280/515; 280/478.1; 280/504
[58] Field of Search .......... 280/477, 478.1, 479.1, 280/479.2, 479.3, 504, 507, 514, 515

[56] References Cited

U.S. PATENT DOCUMENTS

| | | | |
|---|---|---|---|
| 2,826,432 | 3/1958 | Clever | 280/477 |
| 3,151,885 | 10/1964 | Johnson | 280/477 |
| 3,326,575 | 6/1967 | Shepley | 280/515 |
| 3,744,819 | 7/1973 | Cook et al. | 280/515 |
| 3,856,331 | 12/1974 | Bogdanovich | 280/479.1 |
| 3,874,704 | 4/1975 | Williams | 280/479.1 |
| 4,015,855 | 4/1977 | Murray | 280/416.2 |
| 4,225,149 | 9/1980 | Koopman | 280/477 |
| 4,288,091 | 9/1981 | Umenda et al. | 280/416.1 |
| 4,389,058 | 6/1983 | Cadwell | 280/416.2 |
| 4,575,111 | 3/1986 | Roberson | 280/477 |
| 5,083,808 | 1/1992 | Torii | 280/515 |

FOREIGN PATENT DOCUMENTS

| | | | |
|---|---|---|---|
| 0728350 | 11/1942 | Fed. Rep. of Germany | 280/515 |
| 0017710 | 2/1981 | Japan | 280/478.1 |
| 0048279 | 2/1990 | Japan | 280/515 |

Primary Examiner—Charles A. Marmor
Assistant Examiner—Anne Marie Boehler
Attorney, Agent, or Firm—Murray E. Thrift; Adrian D. Battison; Stanley G. Ade

[57] ABSTRACT

A hitch for connecting the tongue of a towed vehicle to a drawbar on a towing vehicle is manually operated from the cab of the towing vehicle. The drawbar is of the double-tongue type that receives the trailer tongue between two drawbar arms. A draw pin is maintained on an arm below drawbar and pivots upwardly to couple the drawbar and tongue. The operating mechanism includes a manual actuator in the cab and a mechanical or hydraulic power transmission joining the actuator to the pin setting or pulling mechanism.

9 Claims, 5 Drawing Sheets

TRACTOR HITCH ASSEMBLY

This application is a continuation of application Ser. No. 365,702, filed June 14, 1989, now abandoned.

FIELD OF THE INVENTION

The present invention relates to hitches for towing vehicles and more particularly to a system for engaging and disengaging a draw pin in a drawbar to tongue coupling.

BACKGROUND

The conventional attachment and detachment of farm implements to tractors and the like can be a dangerous operation. Injury may result from power take off entanglement, crushing between towed and towing vehicles and flying metal fragments chipped of a draw pin being hammered into or out of the hitch. In addition, the hooking and unhooking may be a difficult and time consuming operation.

Various mechanical systems have been proposed for providing the desired hitching function. Many of these are relatively complex and heavy, and involve the use of the hydraulic system of the towing vehicle. The use of direct tractor hydraulics is undesirable because on of the hydraulic system outlets must be dedicated to this function and because conventional hydraulics are too powerful and may damage the other components of the hitch. With conventional hydraulics, using the conventional controls, the draw pin could accidentally be withdrawn under load. Personal injury could also result if a human limb was to be caught in the mechanism. If the tractor is not operating, the attachment will not function.

In those systems where the draw pin is spring set, there is often insufficient pin driving power for most applications.

The present invention is concerned with a device that ameliorates or overcomes many of the disadvantages inherent in the known devices for attachment and detachment of farm implements and the like to tractor drawbars, whether these be fixed drawbars or swinging drawbars.

SUMMARY

According to one aspect of the present invention there is provided an attachment for coupling a towed vehicle tongue to a drawbar of a towing vehicle, the drawbar having spaced upper and lower arms with a tongue receiving space therebetween for receiving the tongue, the arms having aligned draw pin holes therein, alignable with a draw pin hole in the tongue, the attachment comprising:

a draw pin adapted to extend through the aligned draw pin holes in the upper and lower arms and the tongue to link the tongue to the arms;

pin mounting means mounting the draw pin for movement between a retracted position out of the tongue receiving space and a coupling position extending through the tongue receiving space and the draw pin holes in the upper and lower arms;

manual actuator means with engaged and release conditions;

actuator mounting means for mounting the manual actuator means in a cab of the towing vehicle;

power transmitting means coupling the manual actuator means and the pin mounting means for moving the pin between the engaged and released positions in response to the movement of the manual actuator means between the engaged and released conditions respectively.

The attachment is operated by hand from the tractor cab. The manual actuator in the cab is linked directly to the pin setting mechanism so that the pin is positively set or drawn according to the operator's manipulations of the manual actuator.

The power transmitting means linking the actuator to the pin mounting mechanism may be a cable driven linkage or, where additional power is required, a hydraulic system with a slave cylinder attached to the draw pin mount and a master cylinder attached to the manual actuator. Especially in the case of a cable system, a spring assist may be used in the system.

According to anther aspect of the present invention there is provided an attachment for coupling a towed vehicle tongue to a drawbar of a towing vehicle, the drawbar having spaced upper and lower arms with a tongue receiving space therebetween for receiving the tongue, the arms having aligned draw pin holes therein, alignable with a draw pin hole in the tongue, the attachment comprising:

a draw pin adapted to extend through the aligned draw pin holes in the upper and lower arms and the tongue to link the tongue to the arms;

pin mounting means mounting the draw pin for movement between a retracted position out of the tongue receiving space and a coupling position extending through the tongue receiving space and the draw pin holes in the upper and lower arms;

actuator means mounted on the drawbar and projecting into the tongue receiving space for engagement with and displacement by a tongue received therein;

linkage means coupling the actuator means to the pin mounting means for moving the pin from the retracted position to the coupling position.

With this system, the hitch is "triggered" by the presence of the tongue in a hitching position with respect to the drawbars. An over centre linkage is desirably used with such an attachment to inhibit inadvertent setting or release of the draw pin.

BRIEF DESCRIPTION OF THE DRAWINGS

In the accompanying drawings, which illustrate exemplary embodiments of the present invention.

DETAILED DESCRIPTION

Figure 1:
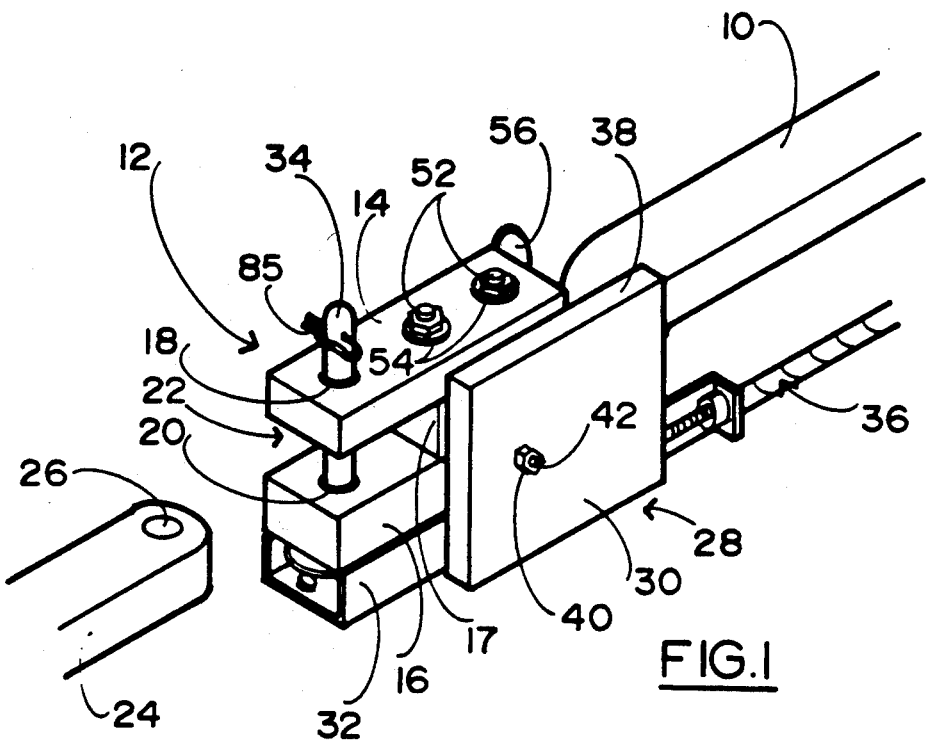
FIG. 1 is an isometric view of an attachment according to the present invention assembled to a drawbar.

Referring to FIGS. 1 through 5, there is illustrated a drawbar 10 of the type having a yoke 12 including an upper arm 14 and a lower arm 16 separated by a block 17. The upper arm 14 and lower arm 16 have respective draw pin holes 18 and 20 aligned with one or other on opposite sides of a tongue receiving space 22 in the drawbar. This space is intended to receive the tongue 24 of a towed implement. The tongue has a draw pin hole 26 that aligns with the holes 18 and 20 for coupling.

A draw pin attachment 28 is mounted on the drawbar 10. It includes a housing 30 to one side of the drawbar, a draw pin arm 32 pivotally mounted on the housing and located beneath the lower arm 16 of the drawbar, a draw pin 34 carried by the draw pin arm and a cable 36 for operating the attachment.

The attachment housing 30 has a cover 38 that is held in place by a nut 40 threaded onto a stud 42. The cover is shown removed in FIGS. 2 through 4.

Figure 6:
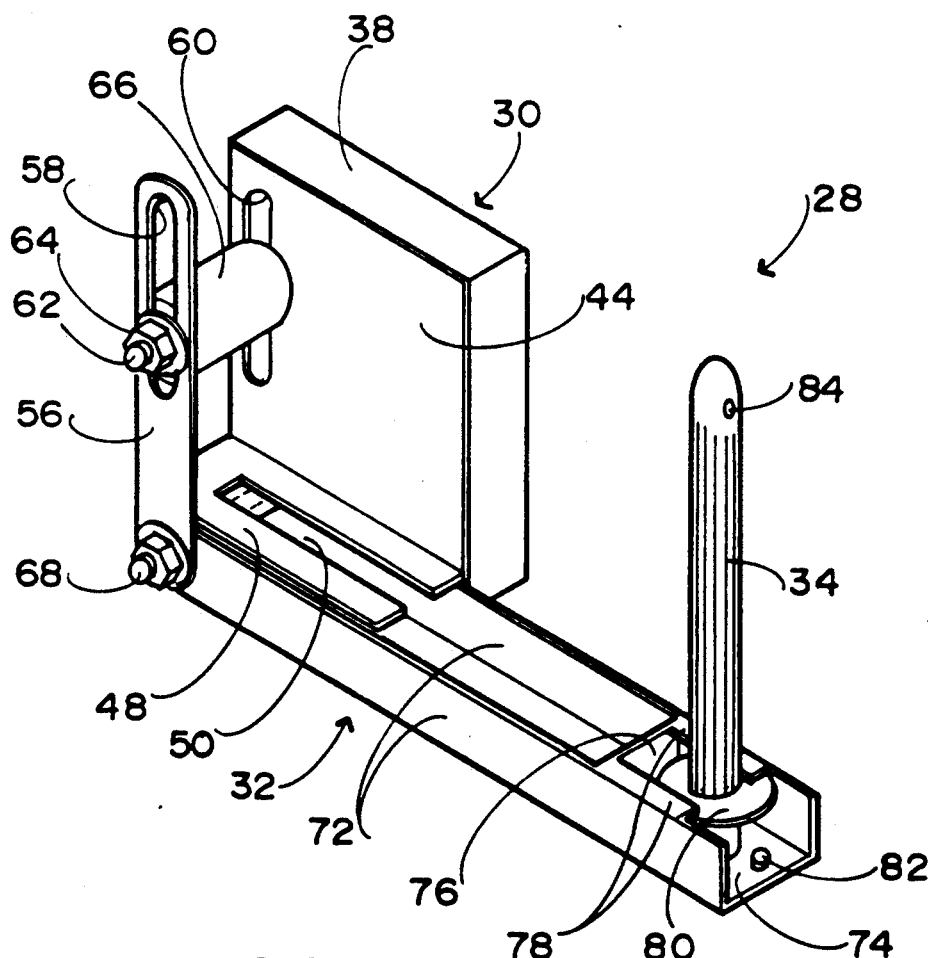
FIG. 6 is an isometric view of the attachment apart from a drawbar.

The housing 30 includes, in addition to the cover 38, a base plate 44 that is mounted flush against one side of the drawbar. At the bottom of the base plate is a mounting plate 48 that extends across the bottom of the drawbar. A slot 50 in the mounting plate (FIG. 6) receives the shanks of two bolts 52 that extend through the upper and lower arms 14 and 16 and the separating block 17 and are held in place by respective nuts 52 on the top of the drawbar.

A back plate 56 is fitted on the side of the drawbar opposite the housing 30. Two elongate slots 58 and 60 in the back plate 56 and housing base plate 44 accommodate a bolt 62 that is fixed in place with a nut 64. A spacer 66 extends between the base plate 44 and the back plate 56. The back plate and the base plate are also joined by a pivot pin 68 that is located below the mounting plate 48 and carries the front end of the draw pin arm 32, which is pivotable about the horizontal, transverse axis of the pin 68.

The draw pin arm 32 consists of two parallel side plates 72 joined at their back ends by a support plate 74 and an end plate 76. The support plate is secured along the bottom edges of the side plates and the end plate 76 extends along the front edge of the support plate, perpendicular to the support plate. A pair of flanges 78 project towards one another from the top edges of the side plates. The flanges extend part way from the end plate 76 towards the rear end of the side plate 72. The gap between the flanges 78 is sufficient to receive the draw pin 34 but narrow enough to retain a collar 80 fitted on the draw pin, so that the draw pin will be retained on the draw pin arm. A set screw 82 projecting from the support plate 74 ensures that the bottom end of the draw pin will not inadvertently slide out of the end of the draw pin arm. This arrangement allows the draw pin to rotate, to promote even wear of the draw pin. It also allows ready interchange of the draw pin to accommodate draw pin holes of different sizes or for any other reasons. The draw pin has a diametral bore 84 adjacent its upper end for receiving a spring retainer 85, as shown in FIGS. 1 and 2, to provide additional security where this is desired.

Figure 2:
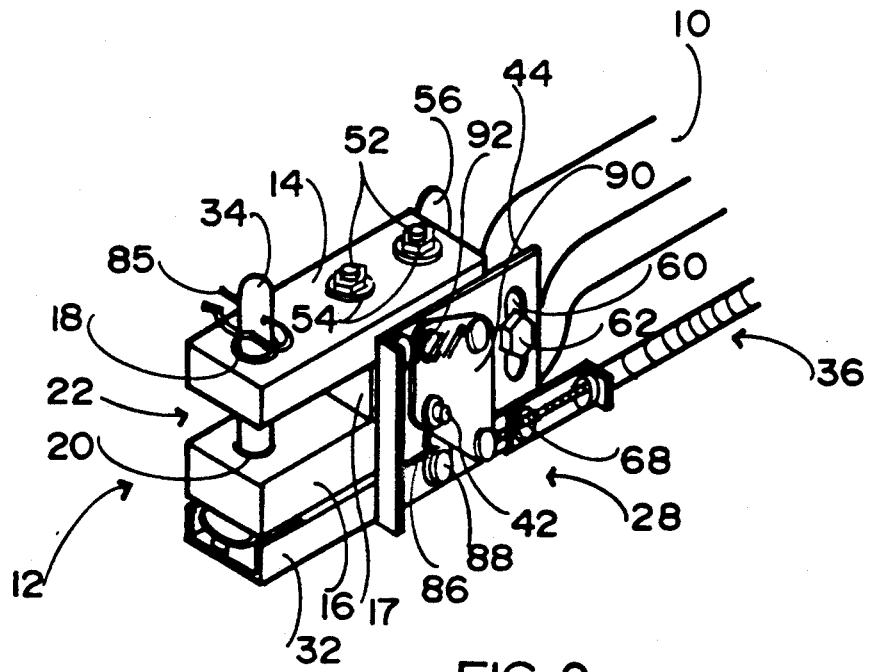
FIG. 2 is a view like FIG. 1 showing the cover of the attachment removed.
Figure 3:
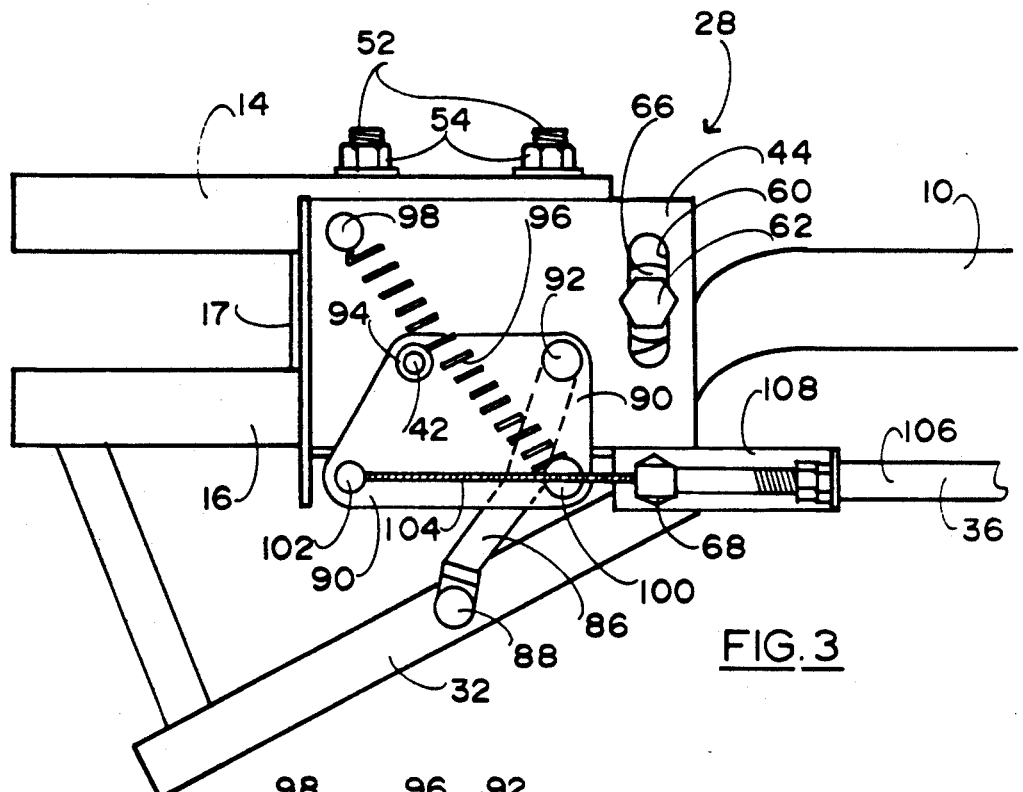
FIG. 3 is a side elevation of the attachment with the cover removed, in a released condition.
Figure 4:
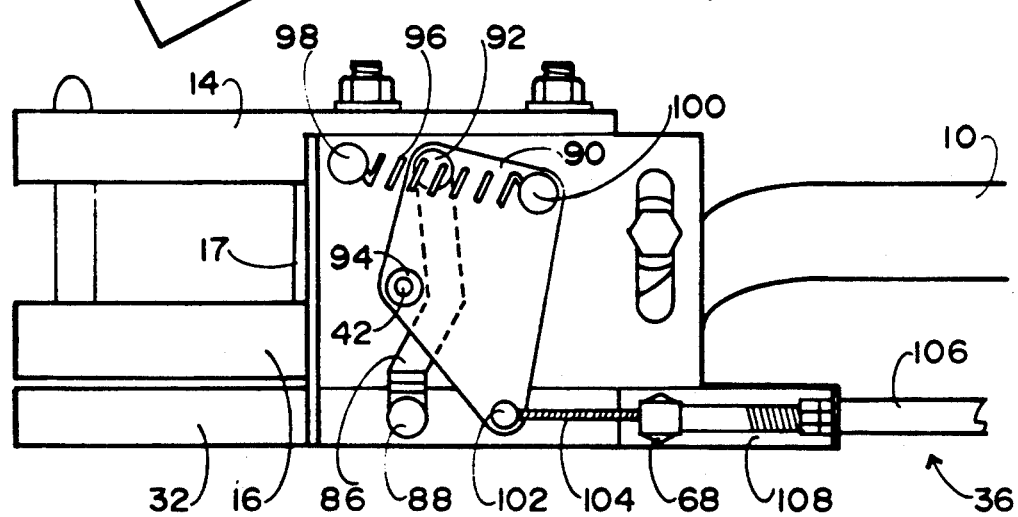
FIG. 4 is a side elevation like FIG. 3 showing the attachment in a coupled condition.
Figure 5:
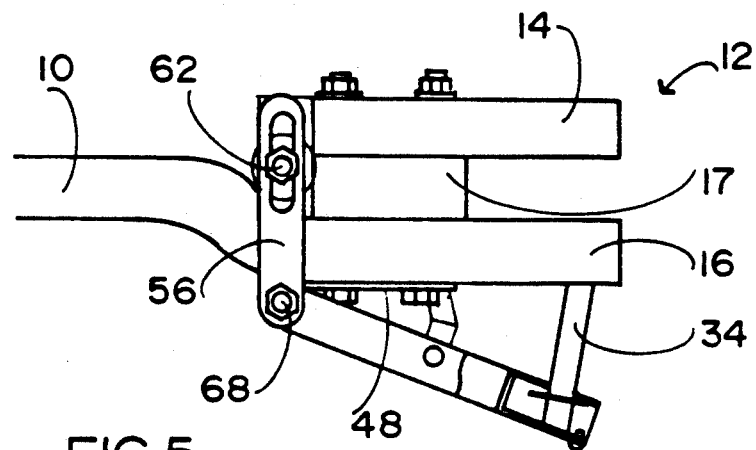
FIG. 5 is a side elevation from the opposite side of the drawbar from FIGS. 3 and 4, showing the attachment in a released condition.

As illustrated most particularly in FIGS. 2, 3 and 4, the attachment includes a lifting link 86 that is connected to the draw pin arm by a pivot 88, located to the rear of the pivot pin 68. The opposite end of the lifting link 86 is connected to a crank plate 90 by a pivot 92. The crank plate is in turn mounted on the base plate 44 by a fixed pivot 94 that extends to the side of the attachment as the stud 42 for securing the cover 38 in place.

As illustrated in FIGS. 3 and 4, the lift link is positioned between the crank plate 90 and the base plate 44. The arrangement of the pivots 88, 92 and 94 is such that in the coupled condition of the attachment illustrated in FIG. 4 a line joining the pivots 88 and 92 of the lift link is very close to the fixed pivot 94. This means that in the coupled condition, a very large downwards force would have to be applied to the draw pin in order to pivot the crank plate 90 from the coupled condition to the release condition illustrated in FIG. 3. To accommodate this geometry, the lift link has a dog-leg shape as illustrated in the drawings.

Movement of the draw pin arm is assisted using a coil spring 96 connected between a spring anchor 98 on the base plate 44 and a spring anchor 100 on the crank plate 90. The arrangement is such that in the coupled condition illustrated in FIG. 4, the line of action of the coil spring, between the anchors 98 and 100, is spaced further from the fixed pivot 94 than it is in the release condition illustrated in FIG. 3. At the same time, there is less tension on the spring in the coupled condition than there is in the release condition. In the release condition of FIG. 3, the force applied to the lift link 86 by the weight of the draw pin arm and the draw pin combined is sufficient to overcome the moment of the spring 96 in its stretched condition, because of the very short moment arm between the line of action of the spring and the fixed pivot 94. As the crank plate pivots counter-clockwise to approach the coupled condition of FIG. 4, the moment arm of the spring force increases, while the moment arm of the lift link 86 decreases, to the point that the counter-clockwise moment applied by the spring overcomes the clockwise moment applied to the crank plate by the lift link and the spring draws the draw pin arm and draw pin into the coupled condition.

Rotation of the crank plate and thus the draw pin arm is effected by cable 36. The cable includes an end fitting 102 connected to the crank plate 90 and the cable core 104. The sheath 106 of the cable is fixed to a cable mount 108 projecting forwardly from the base plate 44. The cable core is a stiff core that can be used either for pushing or for pulling on the crank plate 90 so that a positive rotation of the crank plate and therefore a positive action on the draw pin arm is ensured.

Figure 7:
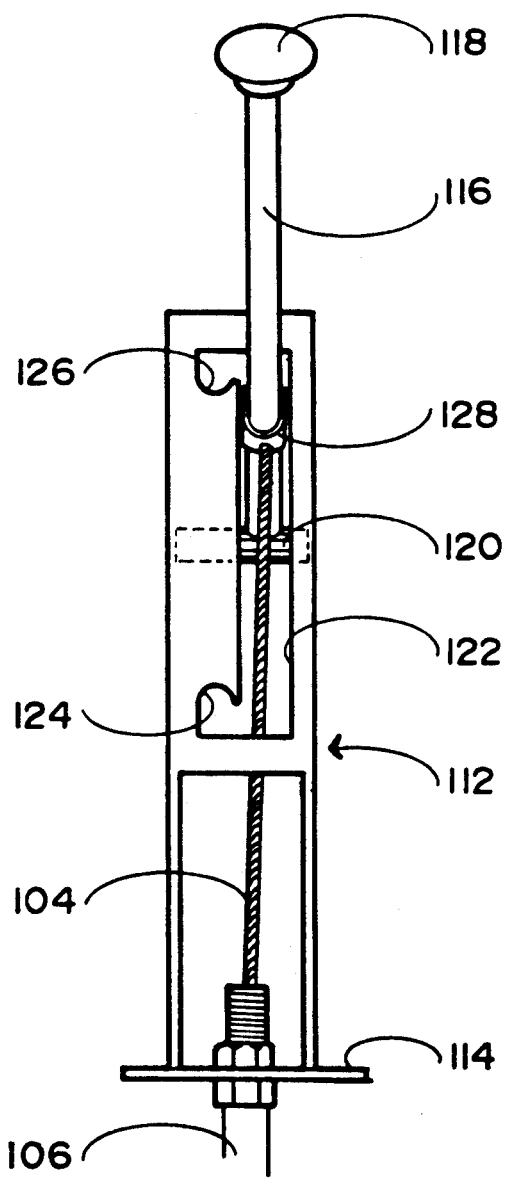
FIG. 7 is a front elevation of a manual actuator.

FIG. 7 illustrates a manual actuator for the attachment. This includes a pedestal 112 with a mounting flange 114 at the bottom end. An actuator arm 116 with a head 118 at its free end is mounted on the pedestal 112 by a horizontal pivot 120 and rides in a vertical slot 122 in the pedestal. The ends of the slot are recessed and undercut to one side at 124 and 126 so that the arm 116 can be latched in position to provide an operator with a positive indication of the condition of the hitch attachment. Cable sheath 106 is fixed to the pedestal base, while the core 104 is connected to the arm 116 by a yoke 128. The cable acts as a power transmitting device for transmitting power from the arm 116 to the draw pin arm through a direct linkage. In use, the pedestal is mounted in the cab of a tractor near an operator's station so that an implement can be connected and disconnected readily, without leaving the cab.

Figure 8:
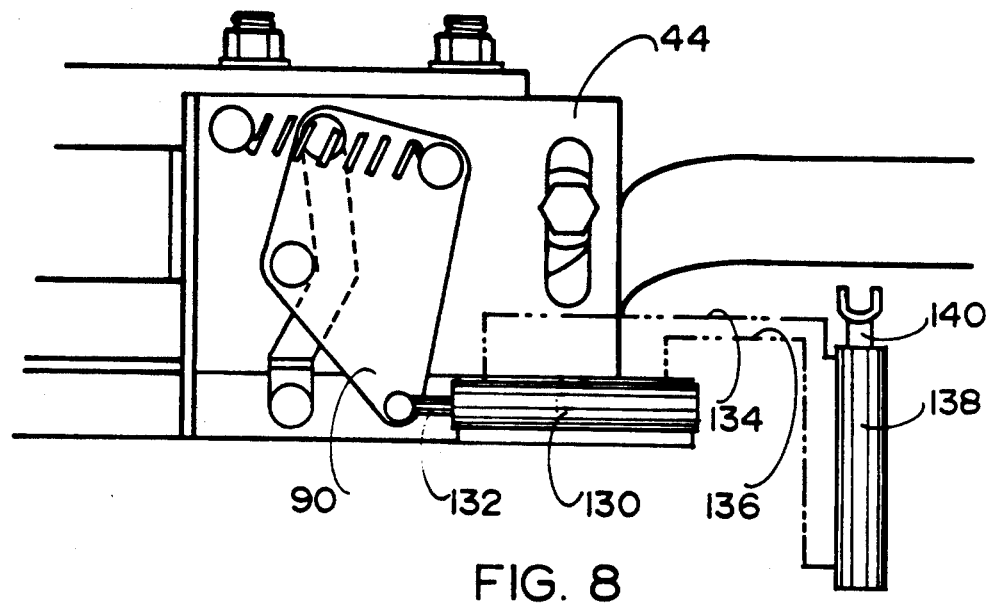
FIG. 8 is side elevation of an alternative embodiment of the invention.

FIG. 8 of the accompanying drawings illustrates an alternative embodiment of the present invention where the mechanical cable joining the crank plate 90 to the actuator 110 is replaced with an hydraulic system including a slave cylinder 130 mounted on the base plate 44 with its piston rod 132 connected to the crank plate 90. The slave cylinder is connected by hydraulic lines 134 and 136 to a master cylinder 138 mounted in the pedestal 112. The piston rod 140 of the master cylinder is connected to the arm 116 of the actuator so that as the arm is moved from one position to the other, it will drive the master cylinder and hence the slave cylinder in a closed circuit. With the hydraulic arrangement, it is also possible to mount the slave cylinder with its piston rod in direct connection with the draw pin arm so that it will pivot the draw pin arm up and down without the intermediary of the crank plate and the lift link.

Figure 9:
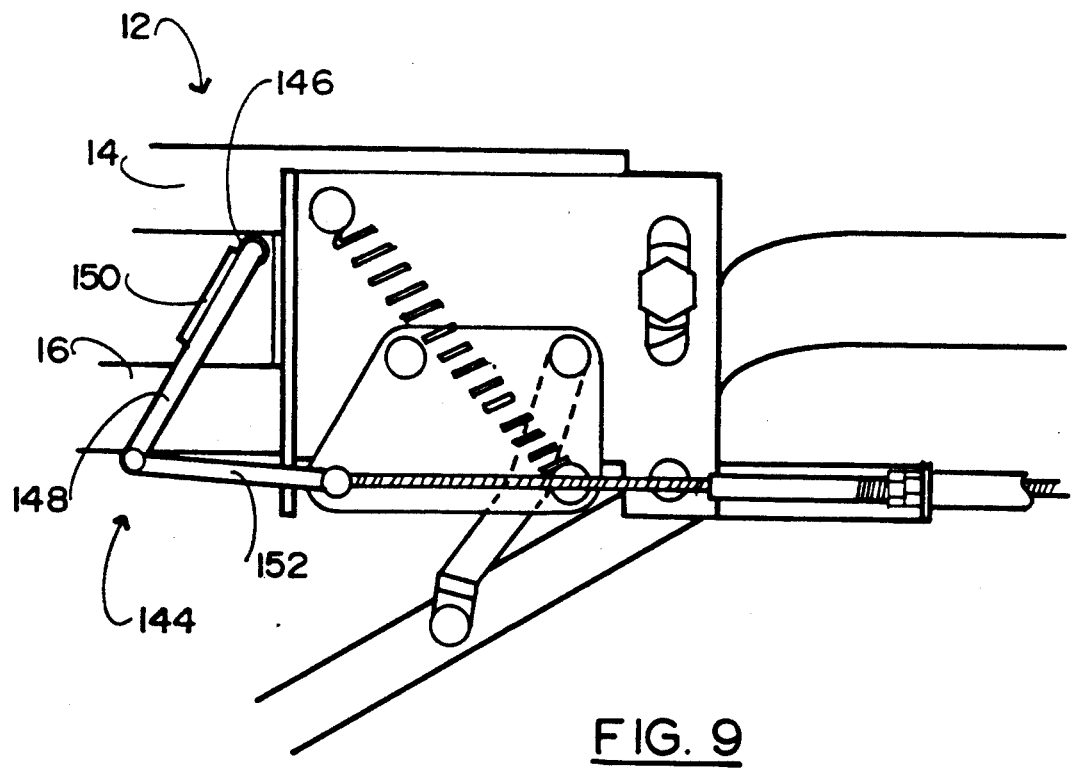
FIG. 9 is a side elevation of a further embodiment of the present invention.

A further embodiment of the invention is illustrated in FIG. 9 where an actuator 144 is fitted o the yoke 12 to initiate the setting of the draw pin when a tongue is introduced into the yoke. The actuator includes a sleeve 146 mounted on the underside of the upper arm 14. An L-shaped rod 148 has one arm pivotable in the sleeve 146 and another arm projecting downwardly from the sleeve and carrying a plate 150 extending across the tongue receiving space between the arms 14 and 16. The lower end of the rod 148 is connected to the crank plate 90 by a link 152.

With this arrangement, when a tongue is introduced into the tongue receiving space it will contact the plate 50, pivot the rod 148 and, through link 15, the crank plate 90. Once the crank plate has reached a transition point in its travel, the moment of the spring 96 will overcome the moment applied by the weight of the draw pin arm and draw pin, so that the spring will bias the attachment towards the closed condition. If additional force is needed to drive the pin, it is available through the use of the cable linkage.

The attachment of the present invention is a relatively simple, light weight mechanism, easy to mount on an existing drawbar or easily incorporated into a drawbar.

While certain specific embodiments of the present invention have been described in the foregoing, it is to be understood that these are exemplary of the invention only and are not to be considered limiting.

Other embodiments are possible within the scope of the invention. Where desired, the actuating linkage system can be made to go "over centre" so that any force acting downwards on the draw pin arm would tend to pivot the crank plate counter-clockwise as seen in FIG. 4, which it cannot do because of the engagement of the lift link 86 with the fixed pivot 94. This effectively locks the attachment in the coupled condition, releasable only by rotation of platego.

The invention is to be considered limited solely by the scope of the appended claims.

I claim:

1. An attachment for coupling a towed vehicle tongue to a drawbar of a towing vehicle, the drawbar having spaced upper and lower arms with a tongue receiving space therebetween for receiving the tongue, the arms having aligned draw pin holes therein, alignable with a draw pin hole in the tongue, the attachment comprising:
   a draw pin adapted to extend through the aligned draw pin holes in the upper and lower arms and the tongue to link the tongue to the arms;
   pin mounting means mounting the draw pin for movement between a retracted position out of and extending below the tongue receiving space and a coupling position extending through the tongue receiving space and the draw pin holes in the upper and lower arms, the pin mounting means comprising:
   a) a draw pin arm with a forward end and a rear end,
   b) pivot means mounting the forward end of the draw pin arm on the drawbar below the lower arm thereof for pivotal movement about an axis transverse to the drawbar and spaced forwardly from the draw pin holes, the draw pin arm being pivotable between a retracted position sloping downwardly to the rear from the pivot means and a coupling position extending along the lower arm; and
   c) means coupling a bottom end of the draw pin to the draw pin arm at the rear end thereof;
   manual actuator means with engaged and release conditions;
   actuator mounting means for mounting the manual actuator means in a cab of the towing vehicle;
   power transmitting means coupling the manual actuator means and the pin mounting means for:
   a) transmitting a coupling force from the manual actuator means to the draw pin arm, the coupling force acting on the draw pin arm to urge the draw pin arm from the retracted position to the coupling position and thereby moving the draw pin from the released position to the engaged position in response to movement of the manual actuator means from the engaged condition to the released condition; and
   b) transmitting a releasing force from the manual actuator means to the draw pin arm, the releasing force acting on the draw pin arm to urge the draw pin arm from the coupling position to the retracted position and thereby moving the draw pin from the engaged position to the released position in response to the movement of the manual actuator means from the engaged condition to the released condition.

2. An attachment according to claim 1 wherein the power transmitting means comprise a mechanical linkage coupled to the draw pin arm and to the actuator means.

3. An attachment according to claim 2 wherein the mechanical linkage includes a lifting link pivotally connected at one end to the draw pin arm and means for lifting and lowering an opposite end of the lifting link, whereby the draw pin arm is pivoted between the retracted and coupling positions.

4. An attachment according to claim 3 wherein the means for lifting the opposite end of the lifting link comprise a crank mounted on the drawbar to pivot about a fixed pivot and connected to the opposite end of the link by a link pivot, and means for turning the crank about the fixed pivot.

5. An attachment according to claim 4 wherein a line joining the pivotal connections of the link to the draw pin and the crank passes adjacent the fixed pivot of the crank in the coupling position and is spaced from the fixed pivot in the retracted position.

6. An attachment according to claim 5 including a spring applying a moment on the crank, biasing the crank towards the coupling position.

7. An attachment according to claim 6 wherein the spring is a tension spring coupled to the crank and to the drawbar with a line of action spaced from the fixed pivot of the crank in the coupling position and adjacent the fixed pivot of the crank in the retracted position.

8. An attachment according to claim 7 wherein the means for turning the crank comprise a cable joining the crank and the manual actuator.

9. An apparatus for coupling a towed vehicle tongue to a towing vehicle, comprising:
- a drawbar having spaced upper and lower arms with a tongue receiving space therebetween for receiving the tongue, the arms having aligned draw pin holes therein, alignable with a draw pin hole in the tongue;
- means for attaching the drawbar to the towing vehicle;
- a draw pin adapted to extend through the aligned draw pin holes in the upper and lower arms and the tongue to link the tongue to the arms;
- pin mounting means mounting the draw pin for movement between a retracted position out of and extending below the tongue receiving space and a coupling position extending through the tongue receiving space and a coupling position extending through the tongue receiving space and the draw pin holes in the upper and lower arms, the pin mounting means comprising:
  a) a draw pin arm,
  b) pivot means mounting a forward end of the draw pin arm on the drawbar below the lower arm thereof for pivotal movement about an axis transverse to the drawbar and spaced forwardly from the draw pin holes, the draw pin arm being pivotable between a retracted position sloping downwardly to the rear from the pivot means, and a coupling position extending along the lower arm; and
  c) means coupling the draw pin to the draw pin arm at a rear end thereof;
- manual actuator means with engaged and release conditions;
- actuator mounting means for mounting the manual actuator means in a cab of the towing vehicle;
- power transmitting means coupling the manual actuator means and the pin mounting means for:
  a) transmitting a coupling force from the manual actuator means to the draw pin arm, the coupling force acting on the draw pin arm to urge the draw pin arm from the retracted position to the coupling position and thereby moving the draw pin from the released position to the engaged position in response to movement of the manual actuator means from the engaged condition to the released condition; and
  b) transmitting a releasing force from the manual actuator means to the draw pin arm, the releasing force acting on the draw pin arm to urge the draw pin arm from the coupling position to the retracted position and thereby moving the draw pin from the engaged position to the released position in response to the movement of the manual actuator means from the engaged condition to the released condition.

* * * * *